(12) United States Patent
Tran et al.

(10) Patent No.: US 7,788,818 B1
(45) Date of Patent: Sep. 7, 2010

(54) MESOSCALE HYBRID CALIBRATION ARTIFACT

(75) Inventors: Hy D. Tran, Albuquerque, NM (US); Andre A. Claudet, Albuquerque, NM (US); Andrew D. Oliver, Waltham, MA (US)

(73) Assignee: Sandia Corporation, Albuquerque, NM (US)

( * ) Notice: Subject to any disclaimer, the term of this patent is extended or adjusted under 35 U.S.C. 154(b) by 370 days.

(21) Appl. No.: 11/866,177

(22) Filed: Oct. 2, 2007

(51) Int. Cl.
*G01B 11/14* (2006.01)
*G01B 3/30* (2006.01)

(52) U.S. Cl. ...................................................... 33/502

(58) Field of Classification Search .................. 33/502, 33/567; 73/1.79; 250/252.1
See application file for complete search history.

(56) References Cited

U.S. PATENT DOCUMENTS

| | | | | |
|---|---|---|---|---|
| 2,536,401 A * | 1/1951 | Victor | | 33/567 |
| 3,908,278 A * | 9/1975 | Sundahl | | 33/502 |
| 4,055,376 A * | 10/1977 | Daberko | | 356/616 |
| 4,364,182 A | 12/1982 | Jones | | |
| 4,373,267 A * | 2/1983 | Lycan | | 33/502 |
| 4,429,464 A * | 2/1984 | Burrus | | 33/502 |
| 4,523,450 A * | 6/1985 | Herzog | | 73/1.81 |
| 5,043,586 A * | 8/1991 | Giuffre et al. | | 250/491.1 |
| 5,109,609 A * | 5/1992 | Anderson | | 33/502 |
| 6,704,102 B2 * | 3/2004 | Roelke | | 356/243.1 |
| 6,757,629 B2 | 6/2004 | Takizawa et al. | | |
| 6,869,480 B1 * | 3/2005 | Abel et al. | | 117/89 |
| 7,001,376 B2 * | 2/2006 | Somani et al. | | 606/5 |
| 7,078,691 B2 * | 7/2006 | Nakayama | | 250/311 |
| 7,576,317 B1 * | 8/2009 | Tortonese et al. | | 250/252.1 |

OTHER PUBLICATIONS

Hy Tran et al, "Large Batch Dimensional Metrology Demonstrated in the Example of a LIGA Fabricated Spring" SAND2004-8083J, 2004.
Theodore D. Doiron, "Grid Plate Calibration at the National Bureau of Standards," Journal of Research of the National Bureau of Standards, vol. 93, No. 1, Jan.-Feb. 1988, pp. 41-51.

* cited by examiner

*Primary Examiner*—Christopher W Fulton
(74) *Attorney, Agent, or Firm*—Carol I. Asbby

(57) ABSTRACT

A mesoscale calibration artifact, also called a hybrid artifact, suitable for hybrid dimensional measurement and the method for make the artifact. The hybrid artifact has structural characteristics that make it suitable for dimensional measurement in both vision-based systems and touch-probe-based systems. The hybrid artifact employs the intersection of bulk-micromachined planes to fabricate edges that are sharp to the nanometer level and intersecting planes with crystal-lattice-defined angles.

14 Claims, 9 Drawing Sheets

MESOSCALE HYBRID CALIBRATION ARTIFACT

The United States Government has rights in this invention pursuant to Department of Energy Contract No. DE-AC04-94AL85000 with Sandia Corporation.

BACKGROUND OF THE INVENTION

Mesoscale dimensional metrology, where mesoscale is defined as submicrometer to several millimeter range, is a challenging field. Typical commercial equipment used in mesoscale dimensional metrology is vision-based probing, also called video inspection or vision inspection. While this equipment is capable of submicron resolution, the traceable accuracy is generally at the micron-level due to the limited certifiable accuracy of calibration artifacts. Typical calibration artifacts used to calibrate vision inspection equipment are two-dimensional in nature and are designed to provide a set of optically sharp lines. One example is a set of crosshairs arranged in a grid pattern (a vision calibration grid). However, there is a need for three-dimensional calibration artifacts that can be measured with a high-accuracy measurement tool, such as a coordinate measuring machine (CMM), with a very accurate touch probe to provide traceable accuracy to the submicron level while providing the sharp edges needed in vision-based probing. Artifacts are needed with dimensional features of appreciable size (>1 mm) to facilitate length calibrations; measurement areas on the order of 100 mm×100 mm are desirable. At the same time, it would be desirable to know the location of the features to sub-micrometer accuracy using intrinsic characteristics of the artifacts and by measurement with a high-accuracy system. Such three-dimensional artifacts could be used to provide high-accuracy calibration of vision inspection machines. This invention comprises such mesoscale calibration artifacts which can be certified to better than 0.1 micrometer accuracy and the method for making them.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

Figure 1:
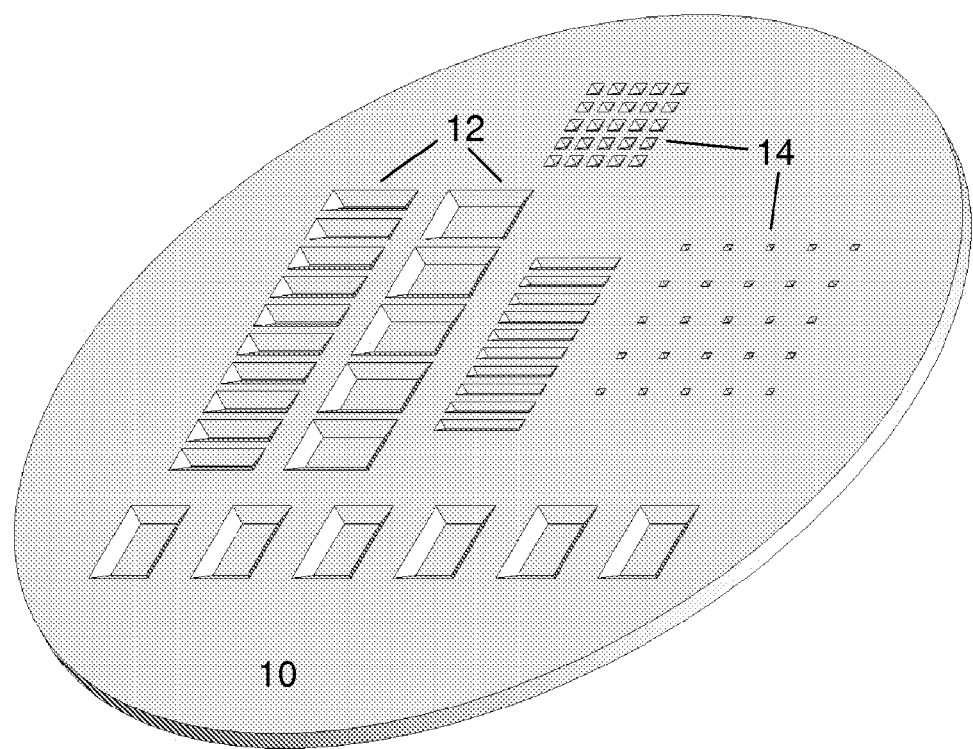
FIG. 1 illustrates a wafer into which several linear arrays of rectangular pits and rectangular arrays of rectangular pits have been etched.

This invention comprises a mesoscale calibration artifact, also called a hybrid artifact, suitable for hybrid dimensional measurement and the method for make the artifact. The hybrid artifact has structural characteristics that make it suitable for dimensional measurement in both vision-based systems and touch-probe-based systems. The hybrid artifact employs the intersection of bulk-micromachined planes to fabricate edges that are sharp to the nanometer level and intersecting planes with crystal-lattice-defined angles. Crystallographically selective etching is employed to selectively form surfaces that are crystal planes with relatively slow etch rates compared to other crystal planes of the material being etched. Etch-rate ratios in excess of 100:1 are possible with anisotropic (crystallographically selective) etches. The intersection of two planes where at least one is formed by crystallographically selective etching can produce a very sharp edge where the radius of curvature at the edge is 100 nm or less. The line edges so fabricated are intrinsically sharp on the scale of nanometers, and the planes so fabricated are flat on a similar scale. The resultant edges can vary from a straight line by less than 100 nm over distances in excess of 1 mm. The angles of the etched planes are determined by the crystallographic planes of material of which the artifact is made. The hybrid artifact may be designed so that it can be measured with a high-accuracy coordinate-measuring machine with a very accurate touch probe. This enables certification of the geometry of the hybrid artifact to submicrometer accuracy (on the order of 100 nm or less). Because micromachining produces sharp edges and planar surfaces defined by the crystallographic structure of the material being machined, the edges can also be measured on a vision inspection machine. While vision inspection machines can measure at a resolution of approximately 100 nm, their stated accuracy is typically much larger (1000 to 2500 nm) due to the limitations of the typical calibration grids employed in certifying dimensional calibration. The calibration grids used in certifying vision inspection equipment typically have a stated accuracy on the order of 1000 nm. The two-dimensional nature of typical calibration grids prevents the use of many types of touch-probe measurements to provide higher accuracy. Embodiments of this invention provide hybrid artifacts that can be accurately measured by a high-accuracy touch-probe technique at the submicrometer level and that are suitable for use as calibration artifacts with submicrometer accuracy in vision inspection systems. An illustrative embodiment of this invention is presented in FIG. 1.

In embodiments of this invention, bulk micromachining techniques are used to fabricate artifacts which have crystallographically defined edges and lines that are very sharp and very straight. An edge is very sharp if the radius of curvature at the intersection of two planes defining the edge is less than approximately 100 nm. A line or edge is very straight if it deviates from a straight line by less than approximately 100 nm. Etchants that produce etch rates for some crystal planes that are appreciably slower than for other crystal planes may be used to fabricate well-defines planes that intersect with other planes to form sharp, straight edges; these are termed anisotropic etches or crystallographically selective etches. For example, starting with bulk single-crystal silicon, crystallographic angles of 35.26, 54.74, and 90 degrees can be formed from the intersection of crystallographic planes to form edges that are sharp to then nanometer level. Because anisotropic wet etch processes are based on the differential chemical reactivity of different crystal planes, the angles formed by etching are defined by the characteristic crystal structure of a material.

The calibration artifact of various embodiments of this invention is designed to have features that accommodate both vision and touch probing. An artifact with characteristics useful for both vision and touch-probe calibration is termed a hybrid artifact. Vision or video probing machines are very good at detecting edges. Therefore, the artifact comprises geometric features for inspection by the touch probe that possess edges, for example, the intersection of two planes to construct a straight edge.

Bulk micromachining of a crystalline substrate, such as, for example, a silicon wafer, is used in embodiments of this invention because the angles and planes that are defined by the anisotropic etching are defined by the characteristic crystalline structure of the crystalline substrate. For silicon, bulk micromachining uses wet etching with an alkaline liquid solvent to dissolve silicon that has been left exposed by an etch mask that is most commonly photolithographically defined. The solvent generally an aqueous solvent and may comprise an alcohol as well as water in some embodiments. Some crystallographic orientations dissolve up to 1000 times faster than others. This makes anisotropic etching suitable for the fabrication of structures such as crystallographic planes and V-shaped grooves that can be atomically smooth with dimensions and angles being extremely accurate when a proper etching procedure is used.

For silicon wafers, as an example embodiment, the angles between the top surface of the substrate and the crystal planes are usually not accurate to more than a few degrees for regular wafers and to on the order of a tenth of a degree for specialty wafers. However, using single-crystal material, it is possible to etch the material so that all of the <xyz> planes are parallel. For example, silicon of all wafer orientations, when etched in an anisotropic etchant, such as, for example, aqueous KOH, etches approximately 400 times faster in the <100> direction than in the <111> direction. This anisotropic etching produces exposed crystal planes that are smooth within a few nanometers. The angle between <100> and <111> is reproducible for a plurality of structures on the same wafer, being limited only by the crystalline quality of the source material. Silicon is described herein for example embodiments of this invention because of its ready availability in a highly pure and single-crystal form, its mechanical fracture strength (>0.6 GPa), its Young's modulus (165 GPa), and its ability as a brittle material to break rather than yield. However, other materials that can be selectively etched in a crystallographically anisotropic fashion may also be used for embodiments of this invention. Other materials that may be selectively etched in a crystallographically anisotropic fashion include but are not restricted to silicon carbide and gallium arsenide.

The crystallographic orientation of the starting wafer may be used in different embodiments to provide features with different angular orientations relative to the initial planar surface of the starting wafer. For example, while both <100> and <110> silicon orientations can be anisotropically etched, <110> silicon yields vertical <111> sidewalls while <100> silicon yields sloped <111> sidewalls.

Artifact dimensions are constrained by the bulk material from which they are etched. For example, in embodiments employing silicon wafers as the bulk crystalline material, vertical features are typically 1.5 mm or less in the vertical direction (constrained by wafer thickness) and 150 mm on the x or y direction (constrained by the diameter of the wafer).

In some embodiments, anisotropically etched <100> silicon is employed to provide angled side walls with an angle of 54.74 degrees from vertical. Pyramidal etch pits are sufficiently wide to allow easy access of a touch probe and the slope is gentle enough that the silicon starting material does not have to be especially thick (1.5 mm) to define a plane suitable for touch-probe measurement. The bottom of the trenches may sometimes not be perfectly flat, but instead may be defined by the fast-etching crystal planes and the etching time In one embodiment, a 100-mm-diameter <100> silicon wafer with a thickness of 1.5 mm was employed. The wafer had a 100 nm coating of low-pressure chemical vapor deposition (LPCVD) silicon nitride on its surface. The silicon nitride was patterned for use as the artifact mask. The wafer was then etched in a 6M KOH solution at a temperature of 85° C. The final etch depth was between 1 mm and 1.3 mm. Following the anisotropic etch, the silicon nitride on the front and back sides of the wafer were removed in a solution of hot phosphoric acid. The nitride film was removed in part to avoid any deformation of the substrate due to residual stresses or mismatches of the coefficients of thermal expansion.

Figure 2:
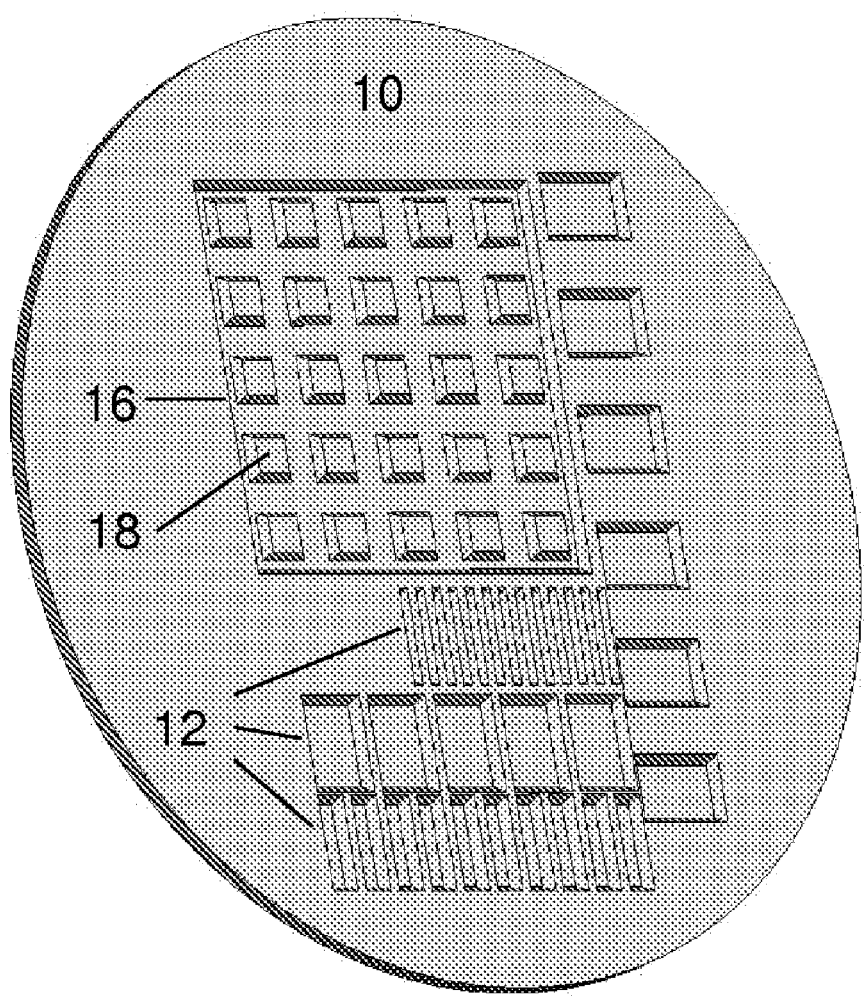
FIG. 2 illustrates a wafer into which linear arrays of rectangular pits and a rectangular array of mesas have been etched.

In embodiments of this invention, crystallographically etched planes can be employed to form pits or mesas. FIG. 1 illustrates a wafer 10 into which several linear arrays 12 of rectangular pits and rectangular arrays 14 of rectangular pits have been etched. An entire wafer may be used as a calibration artifact, or the wafer may be divided to provide several calibration artifacts, where an artifact is defined as the substrate and the etched features that have been formed on it. FIG. 2 illustrates a wafer 10 into which linear arrays 12 of rectangular pits and a rectangular array 16 of mesas 18 have been etched.

In different embodiments, the etched planes can form the sidewalls of a variety of etched feature shapes. The feature shape will depend on the shape and orientation of apertures in the artifact mask and the alignment of the apertures relative to the crystal planes of the substrate. This will be discussed below.

In one embodiment, a 100-mm-diameter <100> silicon wafer with a thickness of 1.5 mm was employed. The wafer had a 100 nm coating of low-pressure chemical vapor deposition (LPCVD) silicon nitride on its surface. The silicon nitride was patterned for use as the artifact mask. The wafer was then etched in a 6M KOH solution at a temperature of 85° C. The final etch depth was between 1 mm and 1.3 mm. An alternative crystallographic etchant was 0.55 M TMAH (tetramethylammonium hydroxide) at a temperature of 60° C. Following the anisotropic etch, the silicon nitride on the front and back sides of the wafer were removed in a solution of hot phosphoric acid. An alternative etchant used for nitride removal was an HF solution. An alternative method for mask removal is by etching long enough for the anisotropic etchant to remove the mask. The nitride film was removed in part to avoid any deformation of the substrate due to residual stresses or mismatches of the coefficients of thermal expansion.

Figure 3:
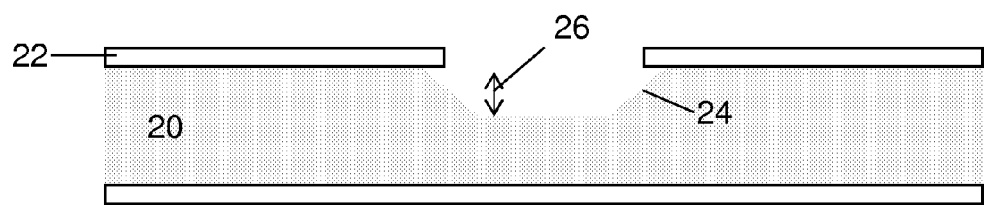
FIG. 3 illustrates a cross-sectional view of a pit that has been etched into a substrate using an anisotropic etch, showing the angled sidewalls defined by the crystallographic planes of the substrate material.

In one embodiment, a <100> silicon wafer 20 is coated with LPCVD silicon nitride. The front-surface silicon nitride is pattered for use as the artifact mask 22. The waver is then etched with anisotropic KOH etchant to produce sidewalls 24 at 54.74 degree angles, as illustrated in FIG. 3 (figure not to scale). The etch depth 26 can be varied by varying the etch time.

Figure 4:
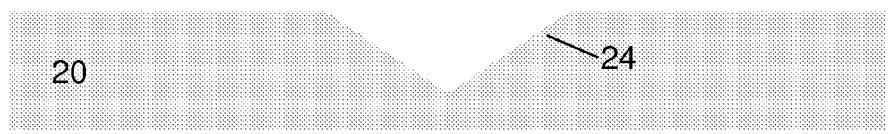
FIG. 4 illustrates a cross-sectional view of a pit where anisotropic etching has proceeded to a depth where the crystallographic planes have intersected to form a V-groove.

FIG. 4 schematically illustrates a wafer from which the nitride has been removed and for which the anisotropic etching has proceeded to a depth where the sloped sidewalls 24 have converged to form a V-shaped groove. The resultant etch planes are flat at a 50 nm level. The edges are sharp and straight at the nm level. Estimated sharpness is less than 50 nm based on an uncertified measurement made with a fiber-contact probe. Deviation from straightness is less than 100 nm (instrumentation limit) over a length of 1 mm.

Figure 5:
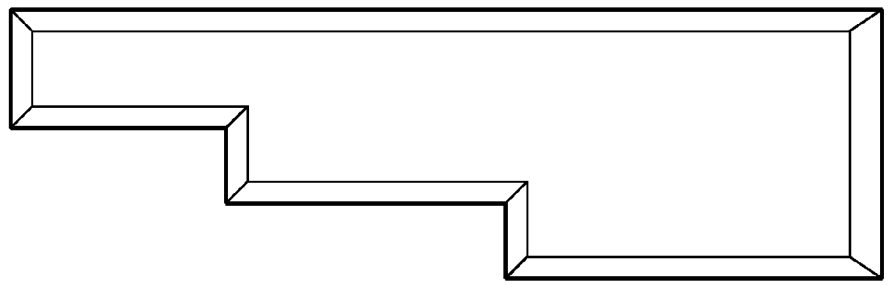
FIG. 5 illustrates some pit shapes based on irregular polygons.
Figure 5:
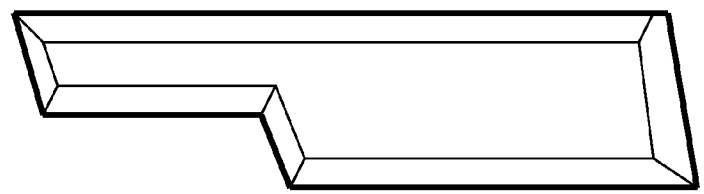
Figure 5:
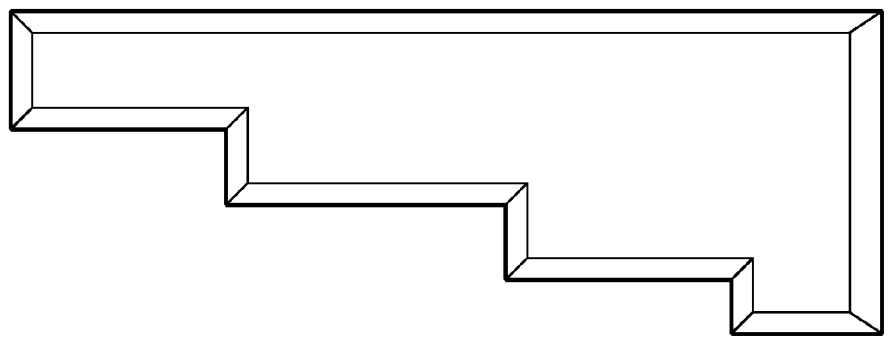

A variety of feature shapes may be employed in embodiments of this invention. Some feature shapes include but are not restricted to pits that are substantially rectangular or irregular polygons. The specific shape will depend on the shape and alignment with the crystalline substrate of an aperture in the artifact mask. Some examples of irregular polygon-based feature shapes are presented in FIG. 5.

Figure 6:
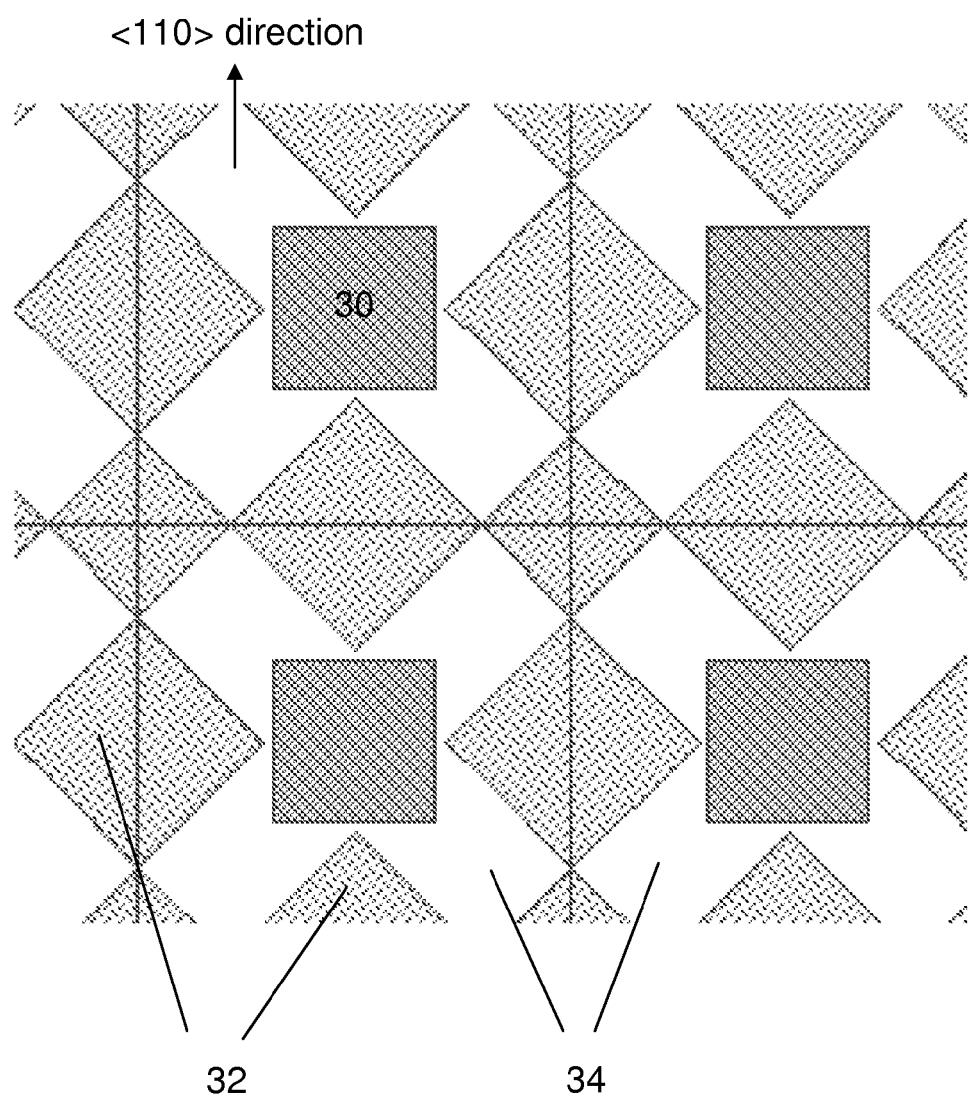
FIG. 6 illustrates a plan view of an artifact mask pattern that can be used with a crystallographically selective etch to form a rectangular mesa. The intended mesa structures correspond to the dark squares. The areas of exposed substrate correspond to the hatched regions. The white areas plus the dark squares (a cross shape) are the regions of substrate initially protected by the masking material.

In some embodiments, it may be desirable to have a polygonal mesa where 2 edges are parallel and another two edges are parallel to each other and perpendicular to the first two edges. This structure is termed a corner-truncated rectangular mesa. Attempts to fabricate such a mesa starting with a rectangular mask feature leads to irregular mesas due to differing crystallographic etch rates. Employment of a corner-correcting mask design can produce mesas suitable for use as a calibration artifact. FIG. 6 illustrates a plan view of an artifact mask pattern that can be used with a crystallographically selective etch to form a corner-truncated rectangular mesa. The idealized (non-truncated) mesa structures 30 correspond to the dark squares. The areas of substrate exposed through apertures 32 in the mask correspond to the hatched regions. The white areas 34 plus the dark squares 30 (combined to form a cross shape) represent the masked regions of the substrate. The apertures in a mask whose combination of masked regions and exposed regions of a substrate produce corner-truncated rectangular mesas are termed corner-correcting apertures.

Figure 7:
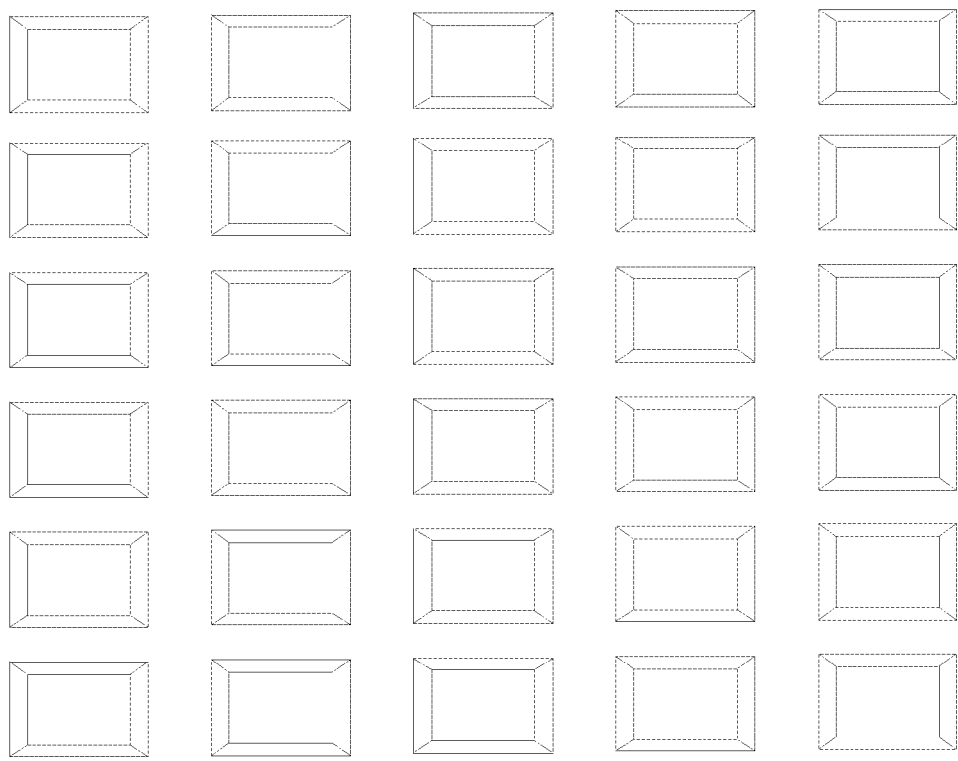
FIG. 7 illustrates a plurality of substantially rectangular pits that are arranged in a rectangular array.
Figure 8:
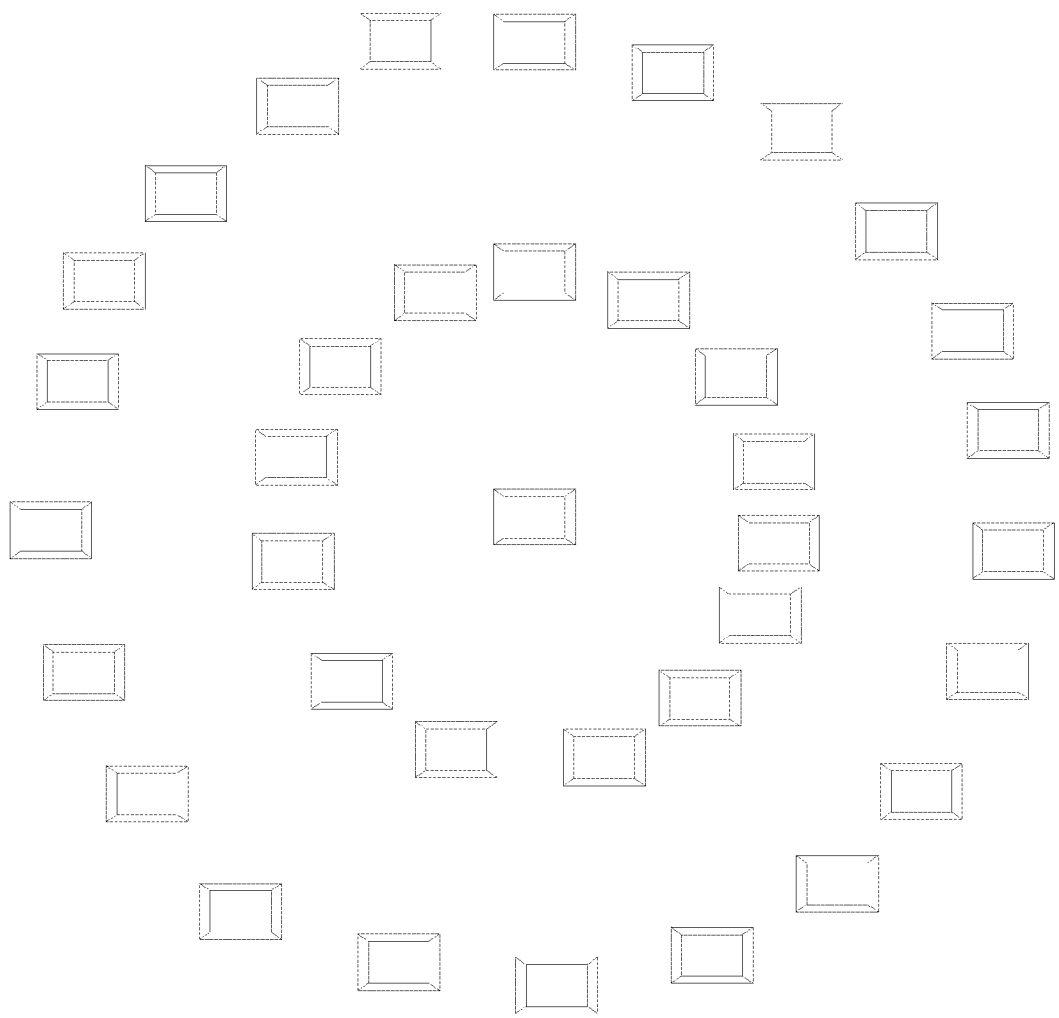
FIG. 8 illustrates a plurality of substantially rectangular pits that are arranged concentrically.
Figure 9:
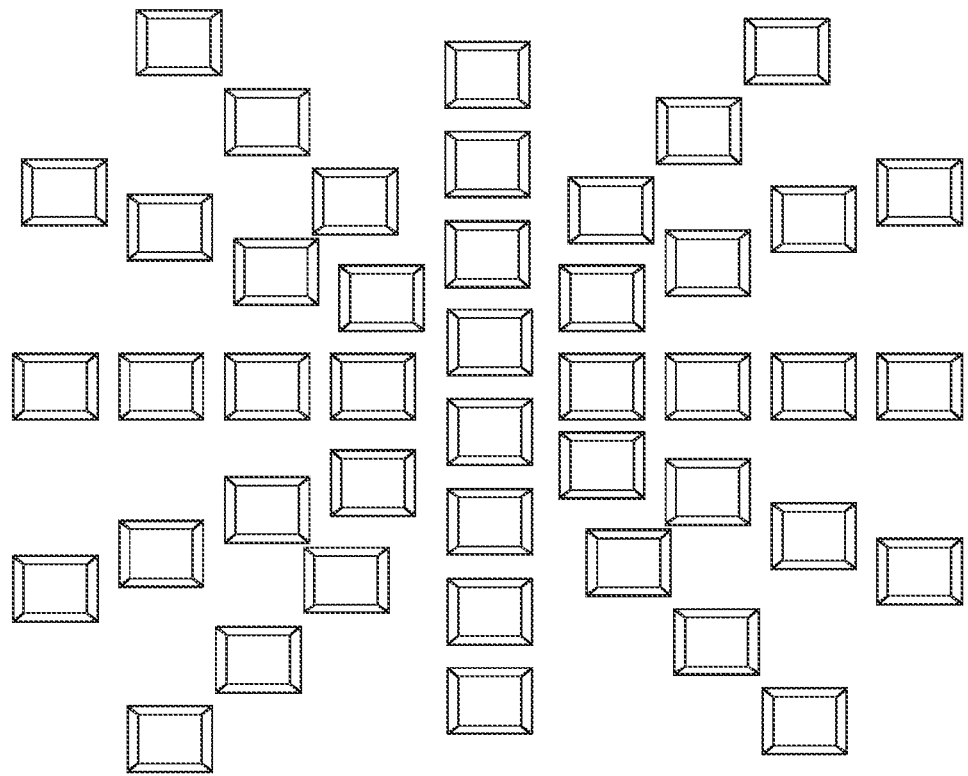
FIG. 9 illustrates an array of pits that form a radiating array.

In some embodiments, a plurality of features (pits or mesas or a combination thereof) comprising an array may be formed in the substrate. FIGS. 7, 8, and 9 illustrate three embodiments; many other arrangements may also be envisioned that are embodiments of this invention. In FIG. 7, a plurality of substantially rectangular pits are arranged in a rectangular array. A single column of substantially rectangular pits that form a linear array represent another embodiment. Offsetting the lines of pits with or without varying the number of pits in each line can produce a trapezoidal array. In FIG. 8, a plurality of substantially rectangular pits are arranged concentrically. In this illustration, the arrangement comprises concentric circles. However, the term concentric is used more broadly to include noncircular arrangements of substantially similar geometric shapes that are centered around the same point. Some such geometric shapes include but are not restricted to rectangles and triangles. In FIG. 9, an array of pits forms a radiating array.

Figure 10:
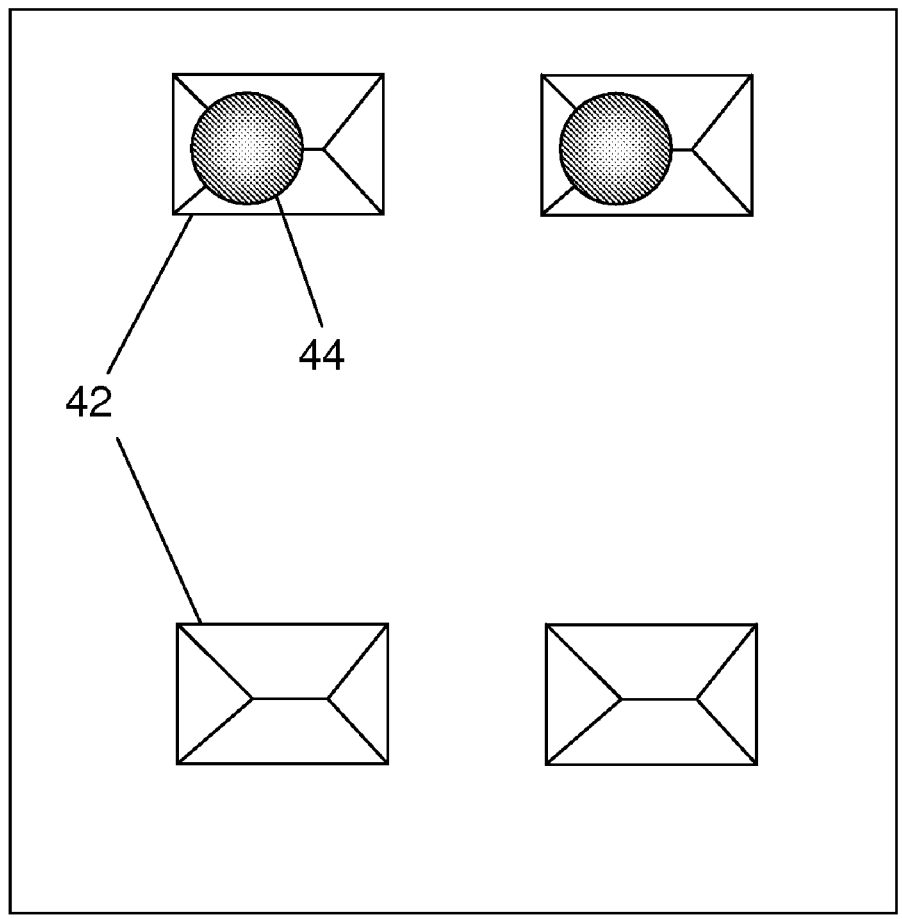
FIG. 10 illustrates an array of rectangular pits that has been partially filled with balls.

In some embodiments, the calibration artifact comprises a mesoscale ball plate. FIG. 10 illustrates an array of rectangular pits that has been partially filled with balls. An array of small pyramidal pits 42 are fabricated in the substrate using anisotropic etching. The pits have a rectangular base. Pit shape is chosen to provide a 3-point kinematic mount for a ball 44. Other pit shapes that provide a kinematic mounting surface may also be used. Small (0.5 mm or 1.00 mm) silicon nitride balls are positioned in the pits so that they each touch at least 3 planar surfaces comprising the walls of each pit. The balls may then be affixed to the planar surfaces. Means of affixing include but are not restricted to applying an adhesive, and electrochemically bonding.

In embodiments where the artifact is to be dimensionally calibrated using a touch-probe means, edge lengths greater than approximately 0.1 mm are generally employed. Typical features on the order of 1 mm are commonly useful for tough-probe measurements. Touch-probe dimensional measurements rely on contacting a stylus with the artifact to be measured. A variety of stylus shapes may be employed; the most common stylus shape is a spherical ball. Stylus balls are commercially available from 0.12 mm diameter to 10 mm diameter. Research-grade probes have been made in the 0.05 mm range. The minimum features that can typically be measured using a commercial touch probe system are typically on the order of 0.1 to 1 mm.

A touch probe means comprises a sensor that detects a point on a surface. Although this detection generally involves a stylus probe, it may use a non-contact point probe, for example, a confocal optical probe. The sensor measures the location of the point at the surface, and, integrated with a computer system and software, can evaluate a Cartesian (x,y, z) location. By measuring multiple points, the touch-probe means may evaluate planes, circles, cylinders, and other geometric features. The touch probe means may be employed to measure points on planes and calculate edges from the intersection of different planes.

Vision or video probing systems collect many points substantially simultaneously; that is, they evaluate an area, from which a computer system and software can extract geometric features, such as lines and edges.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A hybrid calibration artifact, comprising:
   a substrate, the substrate comprising an etched surface region and an unetched surface region; and
   a plurality of etched planes, etched in the substrate and crystallographically aligned with crystallographic planes of the substrate, wherein a first etched plane intersects with at least one of an unetched surface plane and a second etched plane to form an edge defined by an intersection of the crystallographic planes, and wherein at least one pair of the edges are parallel and substantially straight, wherein a length of the edge and an area of the first etched plane have dimensions suitable to be measured using light of wavelengths greater than or equal to near-ultraviolet wavelengths.

2. The hybrid calibration artifact of claim 1, wherein the edge defined by the intersection of crystallographic planes has a radius of curvature of 100 nm or less.

3. The hybrid calibration artifact of claim 1, wherein the edge by the intersection of crystallographic planes deviates from a straight line by less than approximately 100 nm.

4. The hybrid calibration artifact of claim 1, wherein at least a second pair of edges are perpendicular to and intersect the first pair of edges.

5. The hybrid calibration artifact of claim 1, wherein a normal to the first etched plane and a normal to a third etched plane point are parallel and point in a same direction.

6. The hybrid calibration artifact of claim 1, wherein a normal to the first etched plane and a normal to a third etched plane point in different directions.

7. The hybrid calibration artifact of claim 1, wherein the first etched plane extends from the unetched surface plane to an aperture in the second etched plane.

8. The hybrid calibration artifact of claim 1, wherein the plurality of etched planes are arranged in a pattern.

9. The hybrid calibration artifact of claim 8, wherein the plurality of etched planes are arranged in a pattern comprising at least one of a concentric array, a radiating array, a linear array, a rectangular array, and a trapezoidal array.

10. The hybrid calibration artifact of claim 1, comprising at least three etched planes and a sphere in contact with and affixed to the at least three etched planes.

11. The hybrid calibration artifact of claim 1, wherein the plurality of etched planes form an irregular polygon.

12. The hybrid calibration artifact of claim 1, wherein the plurality of etched planes form a corner-truncated rectangular mesa.

13. The hybrid calibration artifact of claim 1, wherein the plurality of etched planes form a substantially rectangular pit.

14. The hybrid calibration artifact of claim 1, wherein the at least one pair of the edges that are parallel and substantially straight are separated by a distance of at least 0.1 mm.

* * * * *